US008226149B2

(12) United States Patent
Brule (10) Patent No.: US 8,226,149 B2
(45) Date of Patent: Jul. 24, 2012

(54) ADJUSTABLE SUNVISOR EXTENSION (76) Inventor: Steve Brule, Kingston (CA)

( * ) Notice: Subject to any disclaimer, the term of this patent is extended or adjusted under 35 U.S.C. 154(b) by 136 days.

(21) Appl. No.: 12/812,339

(22) PCT Filed: Jan. 9, 2009

(86) PCT No.: PCT/CA2009/000018
§ 371 (c)(1),
(2), (4) Date: Jul. 9, 2010

(87) PCT Pub. No.: WO2009/086633
PCT Pub. Date: Jul. 16, 2009

(65) Prior Publication Data
US 2010/0283284 A1 Nov. 11, 2010

Related U.S. Application Data (60) Provisional application No. 61/006,381, filed on Jan. 10, 2008.

(51) Int. Cl.
B60J 3/00 (2006.01)

(52) U.S. Cl. ......................................................... 296/97.6

(58) Field of Classification Search .................. 296/97.4, 296/97.5, 97.6, 97.8, 97.9, 97.11; 248/317, 248/323
See application file for complete search history.

(56) References Cited

U.S. PATENT DOCUMENTS

| 2,549,395 | A | * | 4/1951 | Short, Sr. ...................... 296/97.5 |
| 3,246,925 | A | * | 4/1966 | Calabrese .................... 296/97.6 |
| 4,023,855 | A | | 5/1977 | Janata |
| 4,058,340 | A | | 11/1977 | Pinkas |
| 4,526,415 | A | | 7/1985 | Jardine |
| 5,044,685 | A | | 9/1991 | Yang |
| 5,259,657 | A | | 11/1993 | Arendt |
| 5,356,192 | A | * | 10/1994 | Schierau ...................... 296/97.6 |
| 5,484,183 | A | * | 1/1996 | Rosa ............................. 296/97.6 |
| 5,611,591 | A | * | 3/1997 | Van Devender ............. 296/97.6 |
| 5,626,381 | A | * | 5/1997 | Gervasoni et al. ........... 296/97.8 |
| 5,678,880 | A | * | 10/1997 | Keller .......................... 296/97.6 |
| 5,873,620 | A | * | 2/1999 | Lu ................................ 296/97.5 |
| 6,224,137 | B1 | * | 5/2001 | Hunker ........................ 296/97.6 |
| 6,325,442 | B1 | * | 12/2001 | Hunker ........................ 296/97.6 |
| 6,412,850 | B1 | | 7/2002 | Francis et al. |
| 2002/0038959 | A1 | * | 4/2002 | Francis et al. ............... 296/97.6 |
| 2008/0315616 | A1 | * | 12/2008 | Wang ........................... 296/97.6 |

* cited by examiner

Primary Examiner — Lori Lyjak
(74) Attorney, Agent, or Firm — Bennett Jones LLP (57) ABSTRACT

An apparatus comprising an adjustable visor extension suitable for use with a vehicle sunvisor. The adjustable visor extension is configured to be adjustable with respect to the vehicle sunvisor (e.g. horizontally and/or vertically) and functions to increase the blocking coverage of the vehicle sunvisor to improve the visual acuity of a motorist under otherwise conditions of poor visibility resulting from directly looking at the sun while driving. According to another aspect, the adjustable sunvisor extension is configured to be removably attached to the vehicle sunvisor and is also configurable for attachment or retrofit to non-standard or after-market sunvisors.

19 Claims, 10 Drawing Sheets

ADJUSTABLE SUNVISOR EXTENSION

FIELD OF THE INVENTION

The invention relates to sunvisors, and more particularly to an adjustable sunvisor extension suitable for use with a vehicle sunvisor.

BACKGROUND OF THE INVENTION

Today most motorized vehicles are equipped with sunvisors mounted near the vehicle's windshield. Vehicle sunvisors are typically lowered from a rest or closed position adjacent the vehicle's roof to a position that parallels the windshield to block light from entering through the windshield. Most vehicle sunvisors when lowered can also be turned to the side window to reduce lateral light exposure.

Sunvisors are generally lowered with one hand, thus allowing the driver to adjust the sunvisor while the vehicle is in motion without compromising safety. Sunvisors usually accommodate most situations where it is necessary to block light and reduce glare.

Unfortunately factors exist where vehicle sunvisors exhibit reduced effectiveness. These include, but are not limited to the height of the motorist, their driving position, the design limits for drivers selected by the motor manufacturer, and position of the sun. In this later case the vehicle sunvisors are unable to block light based on the direction of travel, vehicle orientation to the sun, the time of day, and the time of year. Sunvisors are of little use when the sun is at a low position in the sky relative to the horizon and the vehicle is oriented in the direction of the sun. In these situations the motorist typically close to sunrise or sunset is presented without protection from the vehicle sunvisor significantly reducing their visual acuity and increasing the potential for accidents.

Furthermore, typical vehicle sunvisors are designed to accommodate drivers within a predetermined range, as established by the vehicle manufacturer, and both shorter drivers or average drivers with lowered seating may find that sunvisors are even less effective, especially in vehicles with additional headroom. Standard sunvisors also have difficulty at night reducing glare from on-coming traffic.

Accordingly, there remains a need in the art.

BRIEF SUMMARY OF THE INVENTION

The present invention comprises an adjustable visor extension suitable for use with a vehicle sunvisor. According to another aspect, the adjustable visor extension is removable or retrofittable to a vehicle sunvisor.

According to an embodiment, there is provided an apparatus comprising: a visor element having a length that is approximately equal to a length of the vehicle sunvisor and having a width that is approximately equal to a width of the vehicle sunvisor, the visor element having a slot defined therethrough, the slot extending along a portion of the length of the visor element; and a retention member passing through the slot, the retention member for detachably mounting the visor element adjacent to the vehicle sunvisor and for supporting sliding movement of the visor element in a first direction along the length of the vehicle sunvisor and in a second direction along the width of the vehicle sunvisor.

According to another embodiment, there is provided an apparatus comprising: a first visor element; a second visor element, wherein the first visor element and the second visor element in aggregate have a total length that is approximately equal to a length of the vehicle sunvisor and have a total width that is approximately equal to a width of the vehicle sunvisor, each one of the first visor element and the second visor element having a slot defined therethrough, the slot extending along a portion of the length of the respective visor element; and a first retention member passing through the slot of the first visor element and a second retention member passing through the slot of the second visor element, the first and second retention members for detachably mounting the first and second visor elements, respectively, adjacent to the vehicle sunvisor, and for supporting independent sliding movement of the first and second visor elements in a first direction along the length of the vehicle sunvisor and in a second direction along the width of the vehicle sunvisor.

According to another embodiment of the invention, there is provided an apparatus comprising: a generally planar visor element having first and second opposite surfaces, there being a slot defined through the visor element, the slot extending along a portion of a length of the visor element; and a retention member passing through the slot, the retention member for detachably mounting the visor element adjacent to the vehicle sunvisor such that at least a portion of the first surface of the visor element frictionally engages a facing surface of the vehicle sunvisor, and for supporting in-plane sliding movement of the visor element relative to the vehicle sunvisor.

Other aspects and features according to the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments according to the present invention, and in which.

Like reference numerals indicate like or corresponding elements in the drawings.

DETAILED DESCRIPTION OF THE EMBODIMENTS

The present invention is now described with reference to the drawings. In the following description, for purposes of explanation, numerous specific details, such as exemplary dimensions, are set forth in order to provide a thorough understanding of the present invention. It may be evident, however, that the present invention may be practiced without these specific details.

Figure 1A:
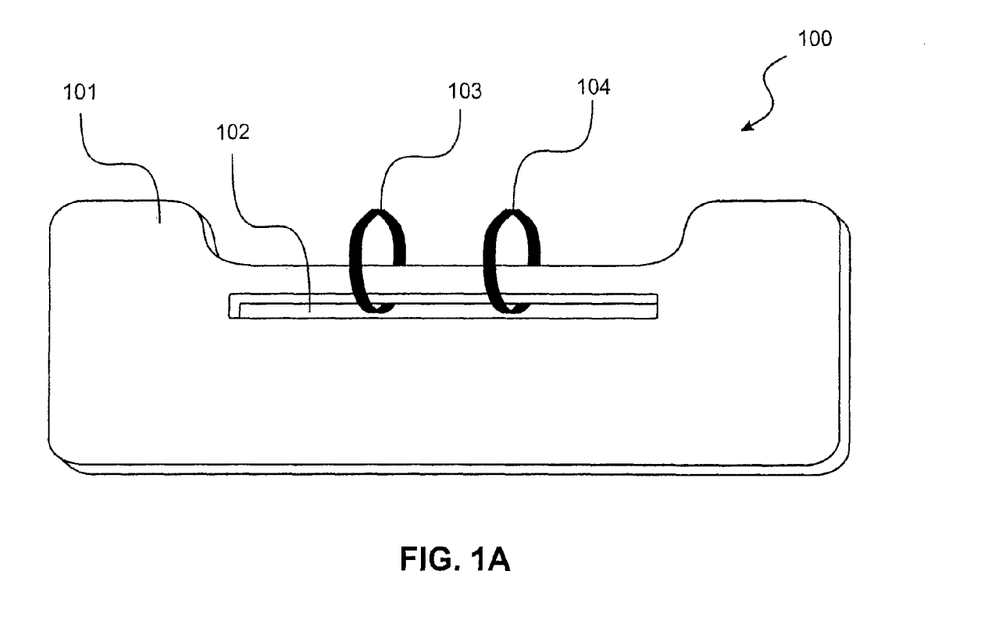
FIG. 1A shows an adjustable visor extension according to a first embodiment of the invention.

Reference is first made to FIG. 1A which shows an adjustable sunvisor extension 100 according to a first embodiment of the invention. The adjustable sunvisor extension 100 comprises a visor element 101, which according to exemplary embodiment is approximately 3/16" to 1/4" in thickness, and with overall dimensions approximately 6" in width by 12" in length. Optionally, the visor element 101 has two approximately 2" tabs located at the upper left and upper right corners thereof. The visor element 101 is fabricated from, for instance, a lightweight inflexible plastic or other suitable material. The visor element 101 is generally planar, however the visor element 101 may be contoured to match curved or non-planar vehicle sunvisors (not shown). According to another aspect, the adjustable sunvisor extension 100 can be configured to be removable from the vehicle sunvisor as described in more detail below.

The visor element 101 includes a slot 102. By way of a specific and non-limiting example, the slot 102 is sized to be approximately 1/2" in width by approximately 5" in length. The slot 102 is located approximately 2.5" from the left side of the visor element 101 and approximately 3/4" from the top of the visor element 101 as it is shown in FIG. 1. The visor element 101 is mounted to a standard or conventional vehicle sunvisor using a pair of elastic retention members 103 and 104. In the instant example, elastic retention members 103 and 104 are continuous loops and are inserted into the slot 102 during the manufacturing process. According to another embodiment or application, the visor element 101 is configured for use with a non-standard, e.g. an after market or third party, vehicle sunvisor.

Figure 1B:
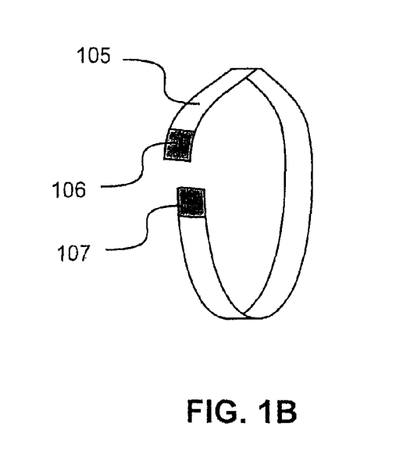
FIG. 1B shows a perspective view of a non-continuous elastic retention member with pressure sensitive readily releasable engaging strips.

According to another embodiment, the elastic retention members are non-continuous and are laced through the slot 102 after the manufacturing process. After the elastic retention members have been laced through the slot 102 they are fastened forming a continuous loop using a fastener, such as for instance pressure sensitive readily releasable engaging strips, also known as Velcro®. FIG. 1B shows a non-continuous retention member 105 with pressure sensitive readily releasable engaging strips 106 and 107.

Figure 1C:
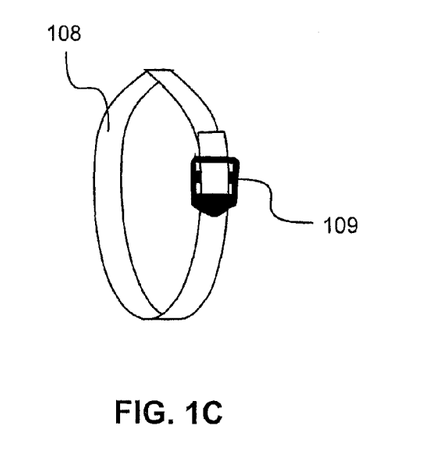
FIG. 1C shows a perspective view of a non-continuous and non-elastic retention member looped through a buckle fastener.

According to another embodiment, the retention member 108 is non-continuous, and made of a non-elastic material such as a braided polyethylene strap looped through a buckle fastener 109 as shown in FIG. 1C.

Figure 2:
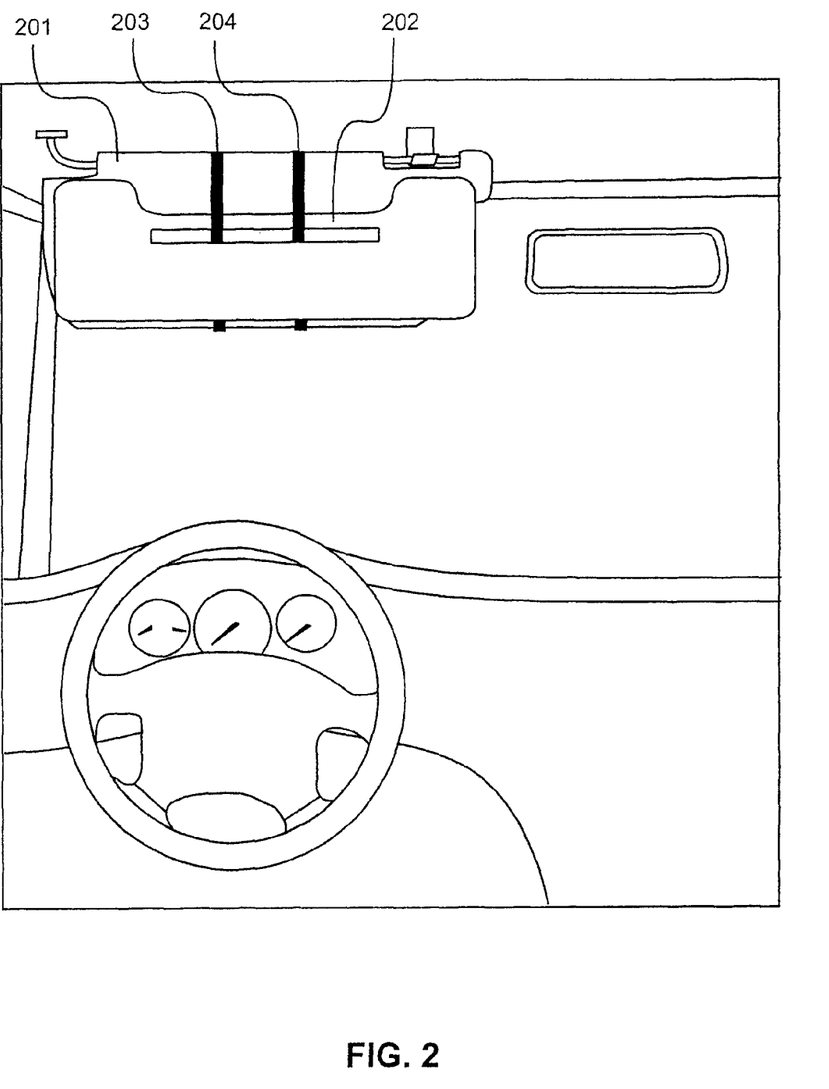
FIG. 2 is an environmental view showing the adjustable visor extension of FIG. 1 mounted to a vehicle sunvisor and positioned or configured in a retracted position.

Reference is next made to FIG. 2, which shows an environmental view of the interior of a motor vehicle with an adjustable visor extension 202 according to a first embodiment of the invention in the retracted position and mounted on a vehicle sunvisor 201 (for example, a standard vehicle sunvisor or a retrofit sunvisor). The visor element 202 is mounted to the vehicle sunvisor 201 by stretching the elastic retention members 203 and 204 to accommodate the height of the vehicle sunvisor 201. The position of the visor element 202 is maintained by the frictional engagement of the elastic retention members 203 and 204, which are spaced apart for further stability. When the visor element 202 is in the retracted position, the total surface area of the visor element 202 substantially overlaps the vehicle sunvisor 201.

Figure 3:
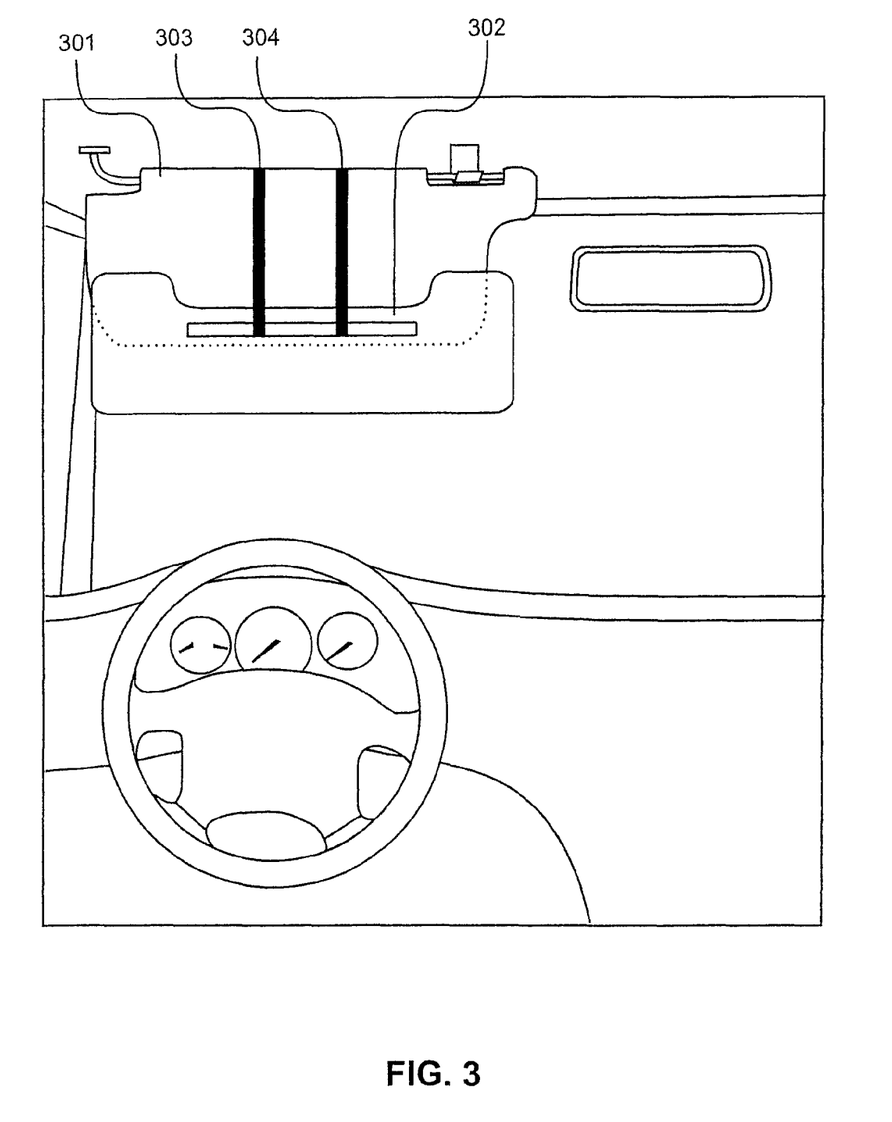
FIG. 3 is an environmental view showing the adjustable visor extension of FIG. 1 mounted to the vehicle sunvisor and positioned or configured in the extended position.

Reference is made to FIG. 3, which shows an environmental view of the interior of a motor vehicle with an adjustable visor extension 302 according to a first embodiment of the invention in the extended position mounted on a vehicle sunvisor 301. The visor element 302 is extended manually by sliding the visor element 302 down relative to the vehicle sunvisor 301, until the desired position is reached. Once the visor element 302 has been adjusted to the desired position, the elastic retention members 303 and 304 maintain the position through frictional engagement. As such, when the visor element 302 is in the extended position, the surface area of the vehicle sunvisor 301 is effectively increased by the non-overlapping or extended portion of the visor element 302.

Figure 4:
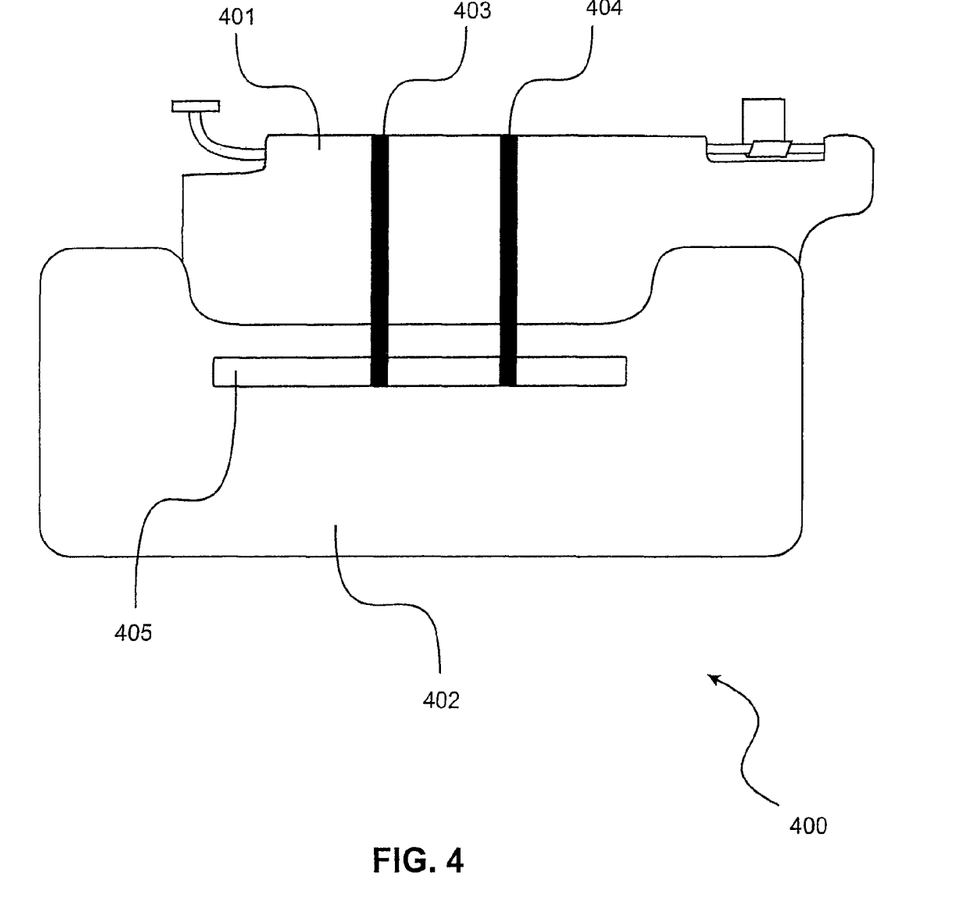
FIG. 4 shows a front view of the adjustable visor extension of FIG. 1 mounted and configured to a vehicle sunvisor in an adjusted extended position.

Reference is next made to FIG. 4, which shows a front view of a removable sunvisor extension 400 in accordance with the first embodiment of the invention mounted to a vehicle sunvisor 401 in an adjusted extended position. The removable sunvisor extension 400 comprises a visor element 402. Once the visor element 402 has been extended to the desired vertical position, the visor element 402 is adjustable horizontally by manually sliding the visor element 402 left or right until the desired position is reached. The elastic retention members 403 and 404 remain fixed in position relative to the vehicle sunvisor 401 while the removable sunvisor extension 402 is adjusted. According to one aspect, the horizontal adjustability permits the visor element 402 to eliminate glare from oncoming vehicles at night when the visor element 402 is adjusted to the far left position as depicted in FIG. 4. The visor element 402 may also be positioned on a diagonal to facilitate forward visibility while blocking glare from on-coming headlights (not shown).

Figure 5:
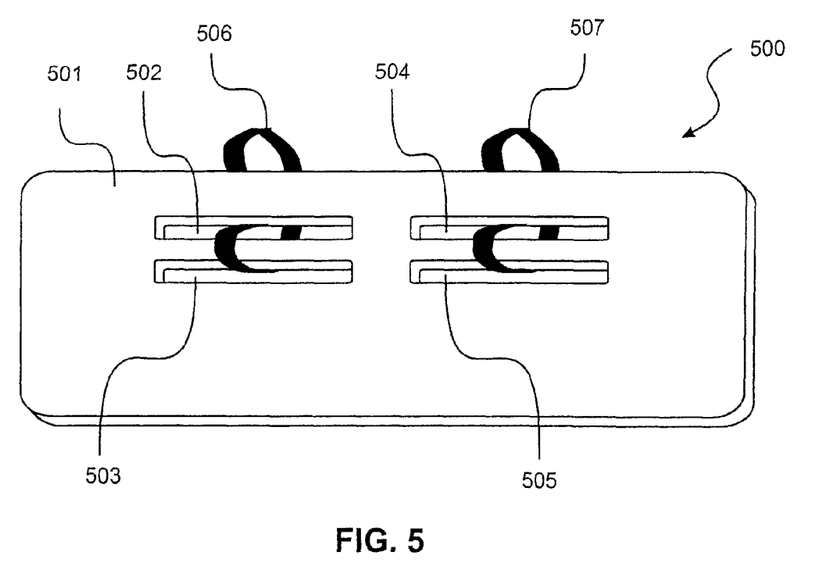
FIG. 5 shows a perspective view of an adjustable visor extension according to another embodiment of the invention.

An adjustable (and removable) sunvisor extension 500 according to another exemplary embodiment of the invention is shown in FIG. 5. As shown, the removable sunvisor extension 500 comprises a visor element 501 having slots 502, 503, 504 and 505, all of the slots being approximately 1/2" in width. The slots 502, 503 are spaced vertically approximately 1/2" apart, and the slots 504, 505 are also spaced vertically approximately 1/2" apart. The slots 502 and 504 are located approximately 3/4" from the top of the visor element 501 and are spaced approximately 3/4" apart, one from the other. The visor element 501 further comprises elastic retention members 506 and 507. The elastic retention member 506 is laced through the slots 502 and 503, and the elastic member 507 is laced through the slots 504 and 505 respectively. The addition of the slots 503 and 505 increases the degree of frictional engagement provided by the elastic retention members 506 and 507. Alternatively the space between the slots 502 and 504, and between the slots 503 and 505, may be eliminated, leaving two long horizontal slots (not shown for clarity).

Figure 6:
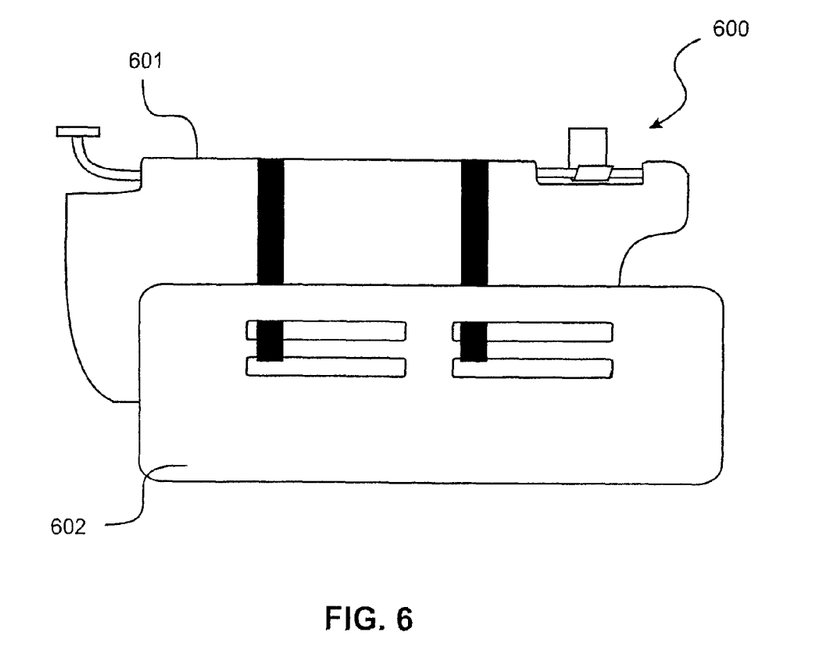
FIG. 6 shows a front view of the adjustable visor extension of FIG. 5 configured in an adjusted extended position and mounted to a vehicle sunvisor.

Referring to FIG. 6, an adjustable sunvisor extension 600 according to another embodiment of the invention is shown mounted to a vehicle sunvisor 601 in an adjusted extended position. In FIG. 6, the adjustable sunvisor extension 602 is shown positioned relative to the vehicle sunvisor 601 and adjusted to the right relative to the vehicle sunvisor 601.

Figure 7:
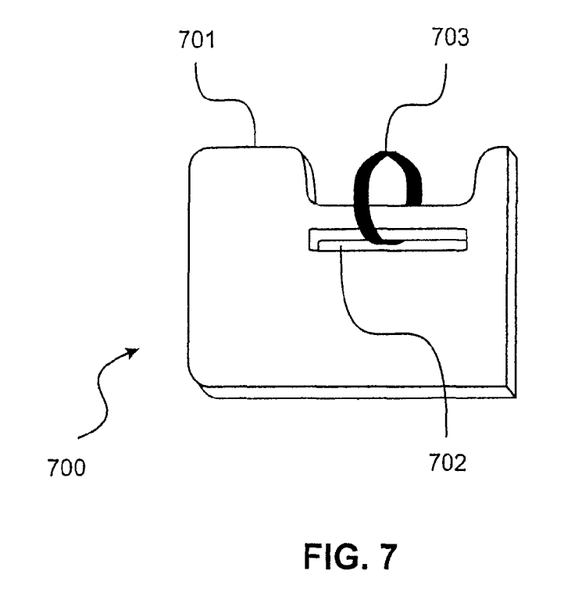
FIG. 7 shows a perspective view of an adjustable visor extension according to another embodiment of the invention.

Reference is next made to FIG. 7, which shows an adjustable sunvisor extension 700 according to another embodiment of the invention. As shown, the sunvisor extension 700 comprises a visor element 701 made of, for example, approximately ³⁄₁₆" thick, lightweight plastic, which, according to an exemplary implementation or configuration, is approximately 5" in width by 7" in length. Optionally, the visor element 701 has two tabs located at the upper left and right corners, as shown in FIG. 7. The visor element 701 includes a single slot 702. The slot 702 is approximately ¼" in width by approximately 4" in length, and is located approximately 2.5" from the left side of the visor element 701 and approximately ¾" from the top of the visor element 701 in accordance with an exemplary configuration. The visor element 701 has an elastic retention member 703 laced through the slot 702.

Optionally, the visor element 701 has a second slot (not shown) identical to the slot 702, located approximately ¾" below the slot 702.

Figure 8:
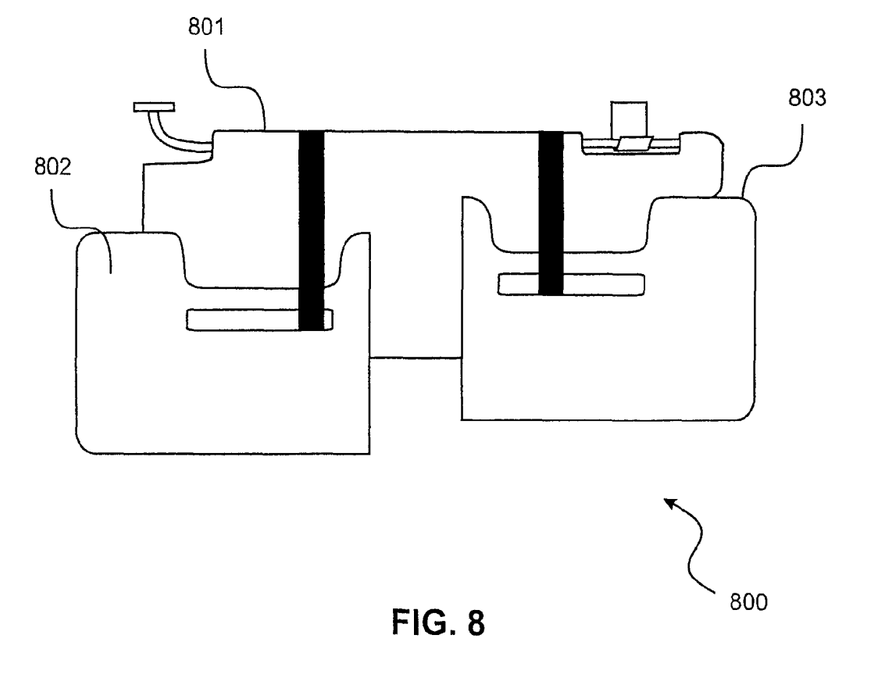
FIG. 8 shows a front view of a pair of the adjustable visor extensions of FIG. 7 configured in adjusted extended positions and mounted to a vehicle sunvisor.

Reference is next made to FIG. 8, which shows a front view 800 of a vehicle sunvisor 801 with a pair of mounted removable sunvisor extensions 802 and 803 according to the embodiment of FIG. 7. As depicted in FIG. 8, usage of a pair of removable sunvisor extensions permits a greater range of positions.

Figure 9:
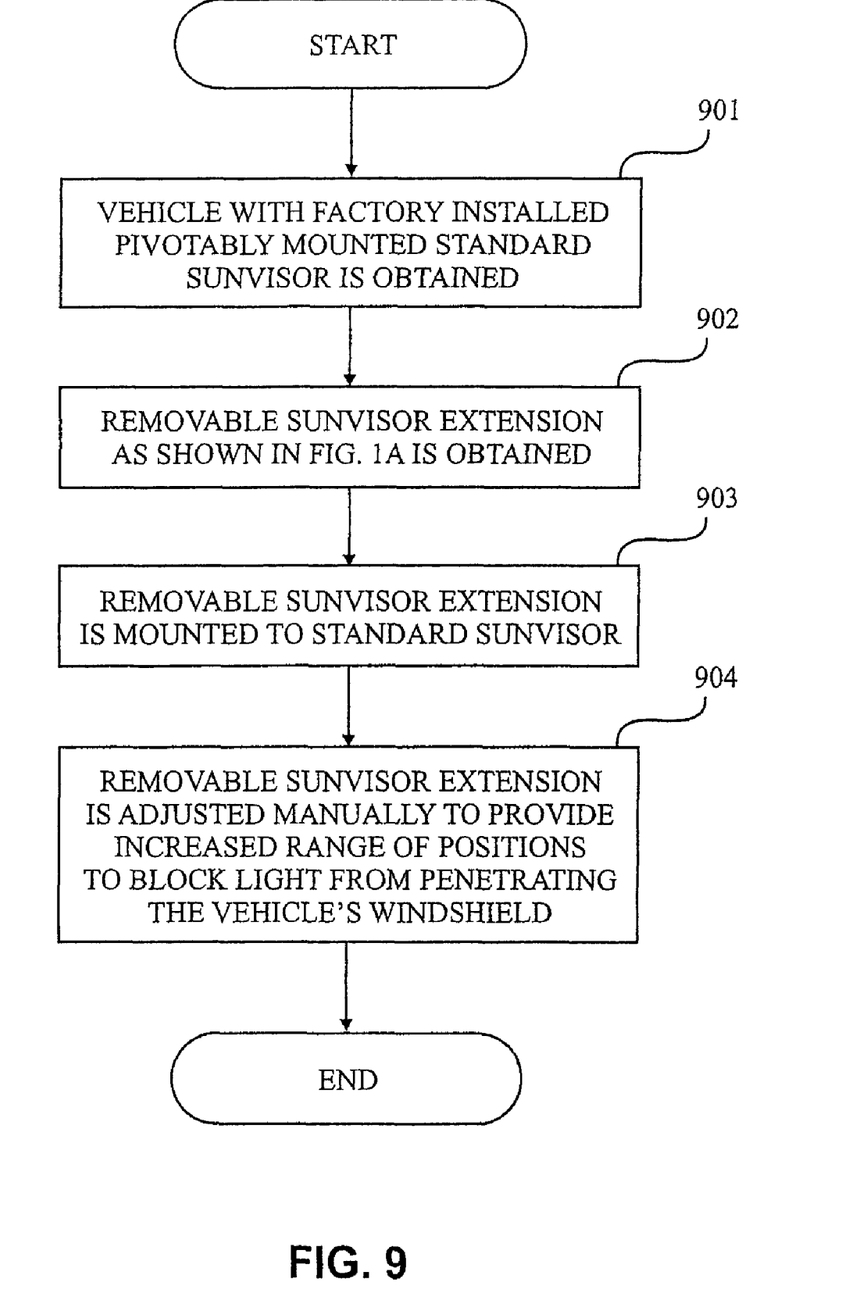
FIG. 9 shows a simplified flow diagram of a method for enhancing visual acuity for a user of a vehicle in accordance with another aspect of the present invention.

Reference is made to FIG. 9, which comprises a flow diagram of a method for enhancing visual acuity for a user of a vehicle in accordance with an aspect of the present invention. A vehicle having at least one pivotably mounted sunvisor, wherein the at least one pivotably mounted sunvisor having a first predetermined range of obscuration of the windscreen is obtained at 901. A second demountably attachable sunvisor shown in FIG. 1A is obtained at 902. The second demountably attachable sunvisor having at least one restraint is attached at 903 to the first pivotably mounted sunvisor by looping the at least one restraint around the first pivotably mounted sunvisor. The second demountably attachable sunvisor is adjusted manually at 904 to provide a second predetermined range of obscuration of the windscreen.

Figure 10:
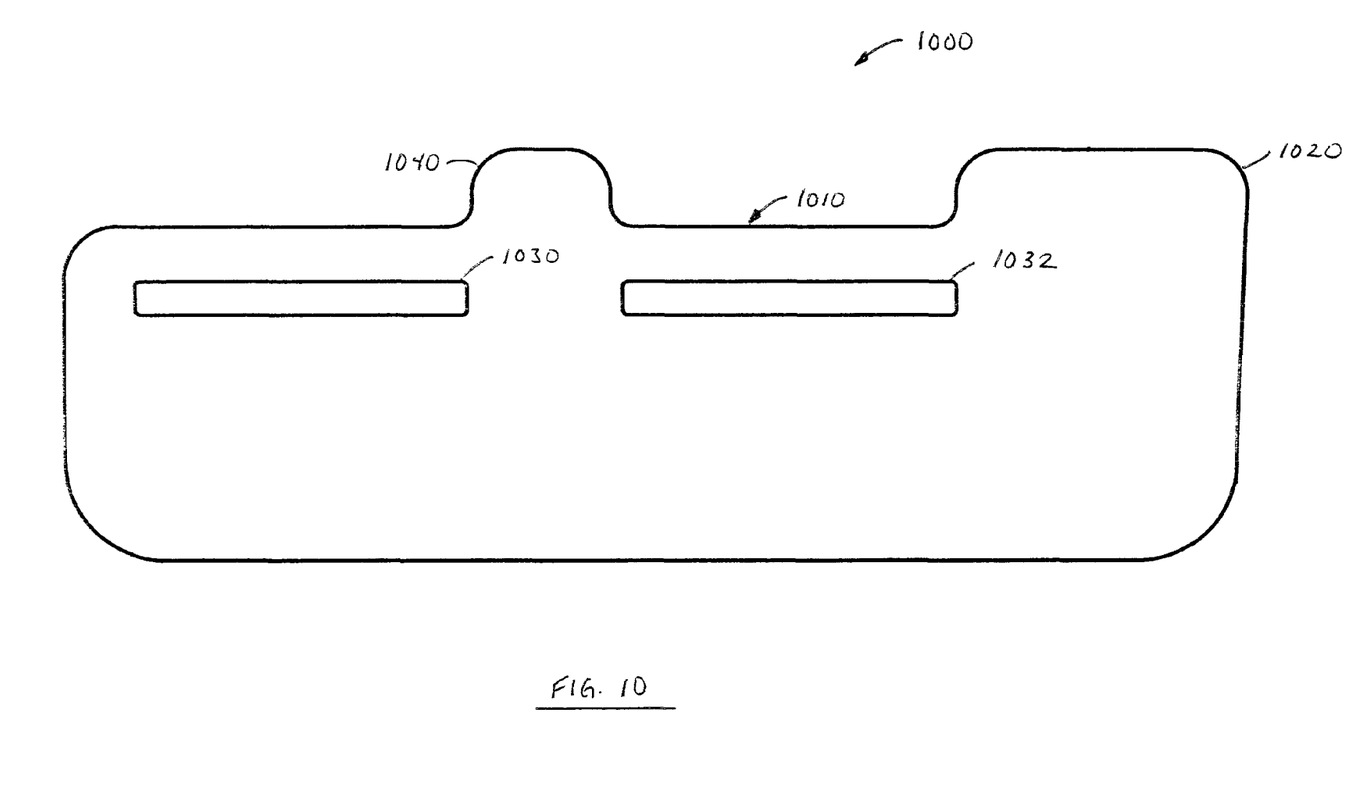
FIG. 10 shows an adjustable sunvisor extension according to another embodiment of the present invention.

Reference is next made to FIG. 10, which shows an adjustable visor extension according to another embodiment of the present invention. The adjustable visor extension is indicated generally by reference 1000 and comprises a visor extension element or body 1010. The visor extension element 1010 includes (e.g. is formed with) an end tab or extension 1020, and first 1030 and second 1032 slots. The slots 1030, 1032 are configured to receive/engage respective retention members, for example, the retention member(s) as described above. As shown, the visor extension element 1010 also includes another extension or tab indicated by reference 1040. The tab 1040 can be formed as an integral component of visor extension body 1010, and according to an embodiment is located approximately in the middle or center of the body 1010. The tab 1040 is configured to provide an additional support surface against the vehicle sunvisor 201 (FIG. 2) and functions to keep the visor extension 1000 flat and/or parallel to the sunvisor.

Figure 11:
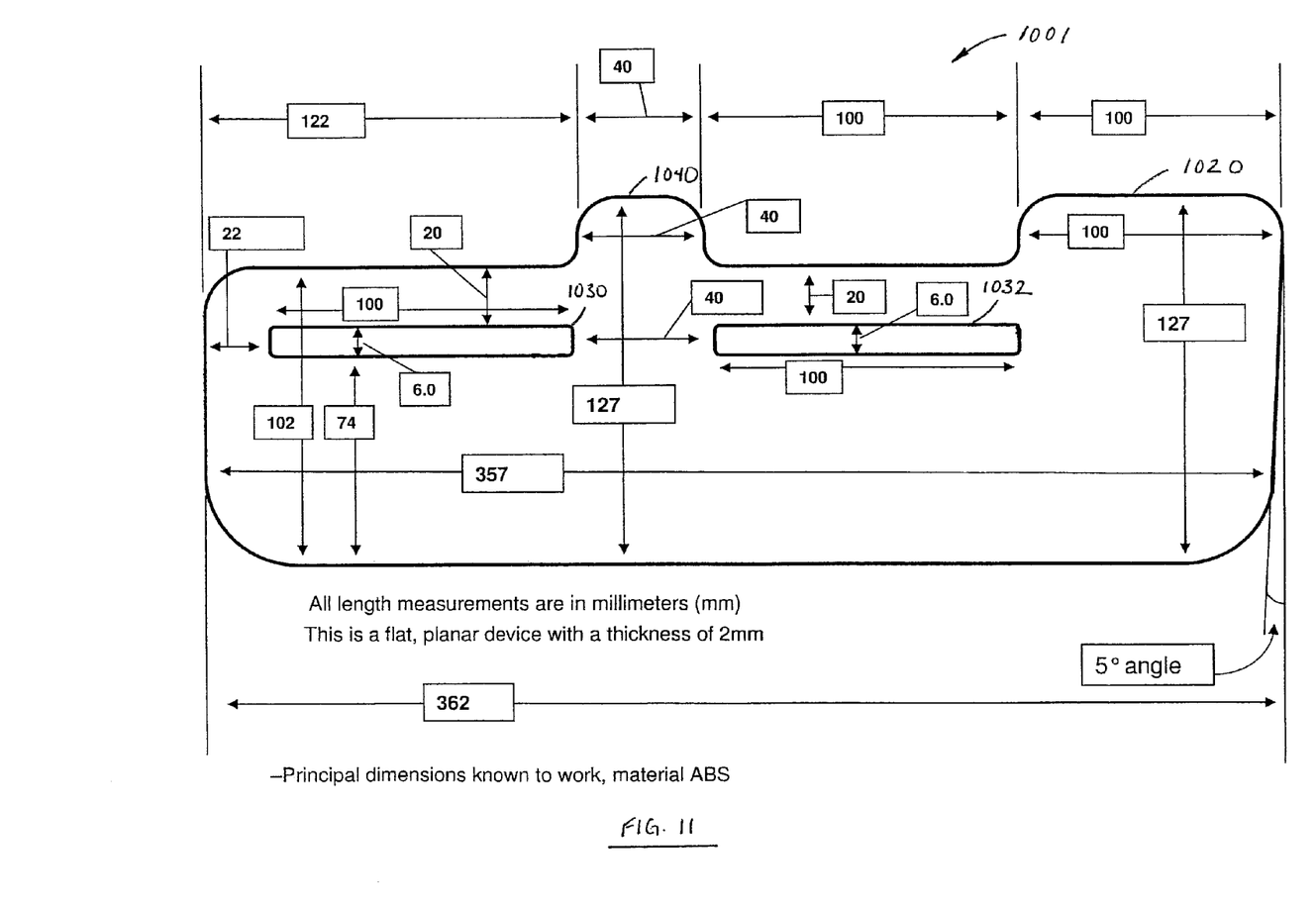
FIG. 11 shows the adjustable sunvisor extension of FIG. 11 with dimensions according to an exemplary configuration or implementation.

Reference is next made to FIG. 11, which shows the visor extension according to the embodiment of FIG. 10 configured with dimensions for exemplary implementation or application. The visor extension is indicated generally by reference 1001 and comprises the visor body 1010, the end tab 1020, the first slot 1030, the second slot 1032, and the central tab or extension 1040. According to this exemplary configuration, the visor body 1010 is formed from an ABS plastic material and has a thickness of approximately 2 mm and a width dimension 362 mm. The first slot 1030 and second slot 1032 each have a height of 6 mm and a width of 100 mm. The end tab or extension 1020 has a width of 100 mm, and the central tab 1040 has a width of 40 mm. The dimensions for the visor extension 1001 shown in FIG. 11 are suitable for a typical automotive sunvisor application. However, it will be appreciated that the dimensions for the visor extension 1001 can readily be modified and will depend in part on the size of the vehicle sunvisor. According to another aspect, the sunvisor extension can be formed or manufactured from a translucent or tinted or a polarized material which can function to dim the glare from the headlights of oncoming traffic during nighttime driving.

Figure 12:
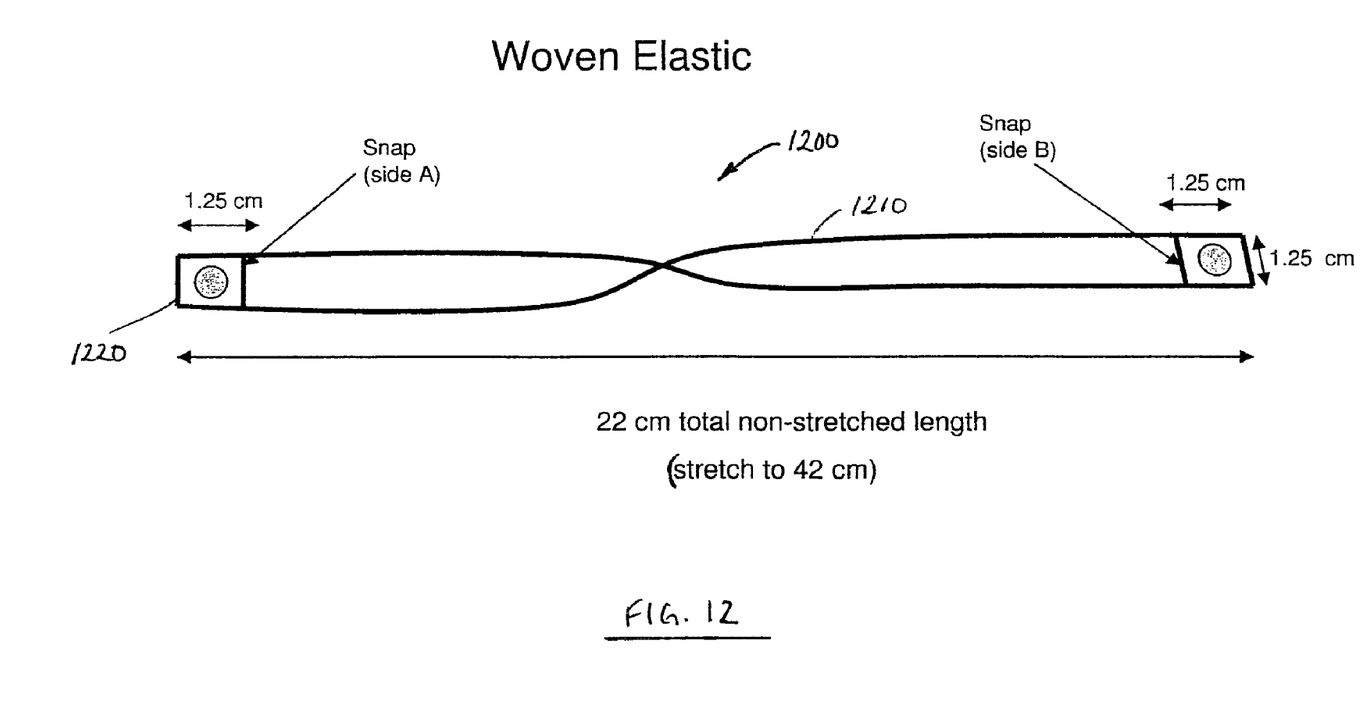
FIG. 12 shows a retention member according to an embodiment of the invention.

Reference is next made to FIG. 12, which shows a retention member according to an embodiment and indicated generally by reference 1200. The retention member 1200 comprises a woven elastic (or braided) strap 1210 and a snap fastener 1220 for connecting the two ends together to form a loop member which is threaded through the visor extension slot(s) for engaging the vehicle sunvisor as described above. According to an exemplary configuration or implementation, the woven elastic strap 1210 has the dimensions as indicated in FIG. 12. The retention member can also be formed from a cylindrical shaped cord, for example, a bungee cord type material.

It will be appreciated that the configuration or geometry of the slot(s), e.g. the slot 102 (FIG. 1), the slots 502-505 (FIG. 5), the slots 1030, 1032 (FIG. 10), will depend in part on the shape of the retention member being used. For example, a cylindrical shaped (e.g. bungee cord type) retention member has a larger or thicker cross section than a woven strap retention member and therefore requires a larger slot height, whereas the thinner woven strap retention member can use a narrower slot height. According to another aspect, the edges of the slot that contact the retention member can be squared-off to provide "bite" or increased frictional engagement between the retention member and the slot. This helps keep the visor extension from shifting or changing position, for example, if the vehicle hits bumps on the road.

According to another aspect, the slot(s) are configured to engage the retention member(s) by deflecting the retention member(s). This deflection is a function of the height of the slot 102 (typically between 1 mm and 10 mm), the thickness of the visor element 101 (typically between 1 mm and 5 mm), and the cross-sectional thickness of the retention straps or members 103, 104 (typically between 0.15 mm and 3 mm). It will be appreciated that the adjustability of the visor extension 101 and/or the secure engagement to the sunvisor is based on an appropriate combination of slot height, visor extension thickness, and the thickness of the retention straps. According to another aspect, the visor extension is fabricated from a lightweight material to provide positional stability on the vehicle visor. For the exemplary configuration depicted in FIG. 11, the visor extension element 1010 has a thickness of 2 mm, the height of the slots 1030,1032 is 6 mm, and the retention member comprises a cylindrical bungee type elastic cord with a diameter of 2.4 mm. This results in a deflection angle of the elastic cord of approximately 40 degrees in the slot.

According to one aspect, the present invention provides an inexpensive adjustable sunvisor extension for use in all vehicles equipped with a sunvisor that is easily accessible by drivers of various heights, and readily adjustable both horizontally and vertically by any desired amount using one hand while driving. According to another aspect, the adjustable sunvisor extension is removable and can be retrofitted to standard vehicle sunvisors or non-standard/after-market visors. According to another aspect, the sunvisor functions to increase the blocking coverage of the vehicle sunvisor to improve the visual acuity of a motorist under otherwise conditions of poor visibility resulting from directly looking at the sun or the headlights of oncoming traffic while driving. Such direct visibility of the sun typically arising as the result of the motorists position relative to a standard sunvisor or the low aspect of the sun as typically arises during sunrise, sunset and during the winter months. The ease of adjustment benefiting the motorist as it may be quickly undertaken and done so with only one hand.

The present invention may be embodied in other specific forms without departing from the spirit or essential characteristics thereof. Certain adaptations and modification of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A sunvisor extension for being detachably mounted to a vehicle sunvisor, comprising:
    a visor element having a length that is approximately equal to a length of the vehicle sunvisor and having a width that is approximately equal to a width of the vehicle sunvisor, the visor element having a slot defined therethrough, the slot extending along a portion of the length of the visor element; and,
    a retention member passing through the slot, the retention member for detachably mounting the visor element adjacent to the vehicle sunvisor and for supporting sliding movement of the visor element in a first direction along the length of the vehicle sunvisor and in a second direction along the width of the vehicle sunvisor; and
    wherein the retention member comprises two separate loop retention members each passing through the slot.

2. The sunvisor extension of claim 1, wherein the retention member comprises a continuous strip of material and a non-continuous strip of material having first and second predetermined portions of a fastener at the distal ends thereof.

3. The sunvisor extension of claim 1, wherein the visor element includes a tab portion extending outwardly from the perimeter thereof along one of the first and second directions.

4. The sunvisor extension of claim 1, wherein the slot comprises a plurality of discrete slots defined through different portions of the visor element, the discrete slots being spaced apart one from the other along at least one of the first and second directions.

5. The sunvisor extension of claim 4, wherein the plurality of discrete slots includes a first slot and a second slot that is spaced apart from the first slot along the first direction, and wherein said two separate loop retention member comprises a first loop retention member passing through the first slot and a second loop retention member passing through the second slot.

6. The sunvisor extension of claim 1, wherein the retention member is sized to extend width-wise around the vehicle sunvisor and to be under tension when in the mounted condition.

7. A sunvisor extension for being detachably mounted to a standard sunvisor, comprising:
    a first visor element;
    a second visor element, wherein the first visor element and the second visor element in aggregate have a total length that is approximately equal to a length of the vehicle sunvisor and have a total width that is approximately equal to a width of the vehicle sunvisor, each one of the first visor element and the second visor element having a slot defined therethrough, the slot extending along a portion of the length of the respective visor element; and,
    a first retention member passing through the slot of the first visor element and a second retention member passing through the slot of the second visor element, the first and second retention members for detachably mounting the first and second visor elements, respectively, adjacent to the vehicle sunvisor, and for supporting independent sliding movement of the first and second visor elements in a first direction along the length of the vehicle sunvisor and in a second direction along the width of the vehicle sunvisor.

8. A sunvisor extension for being detachably mounted to a vehicle sunvisor, comprising:
    a generally planar visor element having first and second opposite surfaces, there being an elongated slot defined through the visor element, the slot extending along a portion of a length of the visor element; and,
    a retention member passing through the slot, the retention member for detachably mounting the visor element adjacent to the vehicle sunvisor such that at least a portion of the first surface of the visor element frictionally engages a facing surface of the vehicle sunvisor, and for supporting in-plane sliding movement of the visor element relative to the vehicle sunvisor; and
    wherein the retention member comprises two separate loop retention members each passing through the slot.

9. The sunvisor extension of claim 8, wherein the slot comprises a plurality of discrete slots defined through different portions of the visor element, the discrete slots being spaced apart one from the other along at least one of the first and second directions.

10. The sunvisor extension of claim 9, wherein the plurality of discrete slots includes a first slot and a second slot that is spaced apart from the first slot along the first direction, and wherein the two separate loop retention members comprises a first loop retention member passing through the first slot and a second loop retention member passing through the second slot.

11. The sunvisor extension of claim 9, wherein the plurality of discrete slots includes a first slot and a second slot that is spaced apart from the first slot along the second direction, and wherein the retention member passes through both the first slot and the second slot.

12. The sunvisor extension of claim 8, wherein the retention member is sized to extend width-wise around the vehicle sunvisor and to be under tension when in the mounted condition.

13. The sunvisor extension of claim 1, wherein the visor element is fabricated from one of a rigid and a semi-rigid material.

14. The sunvisor extension of claim 1, wherein the visor element is generally planar and wherein the visor element is approximately parallel to the vehicle sunvisor when it is detachably mounted thereto.

15. The sunvisor extension of claim 1, wherein the visor element is movable along the first and second directions between a retracted condition in which the visor element substantially overlaps with the vehicle sunvisor and an extended condition for providing increased total visor surface area.

16. The sunvisor extension of claim 8, wherein the generally planar visor element has a width that is approximately equal to a width of the vehicle sunvisor, and wherein the length of the visor element is approximately equal to a length of the vehicle sunvisor.

17. The sunvisor extension of claim 16, wherein the retention member is configured to support in-plane sliding movement of the visor element relative to the vehicle sunvisor in a first direction along the length of the visor element and in a second direction along the width of the visor element.

18. The sunvisor extension of claim 17, wherein the visor element is movable along the first and second directions between a retracted condition in which the visor element substantially overlaps with the vehicle sunvisor and an extended condition for providing increased total visor surface area.

19. The sunvisor extension of claim 8, wherein the visor element is fabricated from one of a rigid and a semi-rigid material.

* * * * *